United States Patent
Marquette et al.

(10) Patent No.: US 11,036,244 B2
(45) Date of Patent: Jun. 15, 2021

(54) CLIMATE CONTROLLED SEAT WITH A THERMAL CONDITIONING DEVICE WHICH IS CONTROLLED BY DETERMINING A HEAT FLUX

(71) Applicant: Gentherm Incorporated, Northville, MI (US)

(72) Inventors: David Brian Marquette, Farmington Hills, MI (US); Daniel Charles Guerithault, Ann Arbor, MI (US); Vladimir Jovovic, Pasadena, CA (US)

(73) Assignee: Gentherm Incorporated, Northville, MI (US)

( * ) Notice: Subject to any disclaimer, the term of this patent is extended or adjusted under 35 U.S.C. 154(b) by 274 days.

(21) Appl. No.: 16/095,064

(22) PCT Filed: Apr. 19, 2017

(86) PCT No.: PCT/US2017/028442
§ 371 (c)(1),
(2) Date: Oct. 19, 2018

(87) PCT Pub. No.: WO2017/184779
PCT Pub. Date: Oct. 26, 2017

(65) Prior Publication Data
US 2019/0101945 A1    Apr. 4, 2019

Related U.S. Application Data

(60) Provisional application No. 62/446,093, filed on Jan. 13, 2017, provisional application No. 62/324,692, filed on Apr. 19, 2016.

(51) Int. Cl.
*G05D 23/19* (2006.01)
*B60N 2/56* (2006.01)
(Continued)

(52) U.S. Cl.
CPC ....... *G05D 23/1917* (2013.01); *B60N 2/5678* (2013.01); *B60N 2/58* (2013.01); *B62D 1/06* (2013.01)

(58) Field of Classification Search
CPC ........ G05D 23/1917; B60N 2/58; B60N 2/56; B60N 2/5678; B60N 2/5685; B60N 2/002;
(Continued)

(56) References Cited

U.S. PATENT DOCUMENTS

| | | | | | |
|---|---|---|---|---|---|
| 4,827,103 | A | * | 5/1989 | Asp | A47C 7/748 |
| | | | | | 219/217 |
| 8,601,824 | B2 | * | 12/2013 | Jun | B60N 2/5657 |
| | | | | | 62/3.4 |

(Continued)

FOREIGN PATENT DOCUMENTS

| EP | 3006263 A1 | 4/2016 |
|---|---|---|
| GB | 2200806 A | 8/1988 |

(Continued)

OTHER PUBLICATIONS

International Preliminary Report on Patentability for International Application No. PCT/US2017/028442 dated Nov. 1, 2018.

(Continued)

*Primary Examiner* — Shawntina T Fuqua
(74) *Attorney, Agent, or Firm* — Carlson Gaskey & Olds, P.C.

(57) ABSTRACT

A method of autonomously providing thermal comfort to an occupant in contact with a component includes the step of determining a heat flux between the component and the occupant. A heat flux inversion is determined using the heat flux. The heat flux inversion corresponds to a change in (Continued)

occupant thermal comfort. A thermal conditioning device is controlled based upon the heat flux inversion to maintain a desired heat flux.

30 Claims, 7 Drawing Sheets

(51) Int. Cl.
*B60N 2/58* (2006.01)
*B62D 1/06* (2006.01)

(58) Field of Classification Search
CPC ........ H05B 3/0042; H05B 3/34; H05B 3/342; H05B 3/345; H05B 3/347; H05B 1/0238; H05B 1/0236; H05B 2203/029; H05B 2203/002; H05B 2203/003; H05B 2203/004; B62D 1/06; A47C 7/748

See application file for complete search history.

(56) References Cited

U.S. PATENT DOCUMENTS

| | | | |
|---|---|---|---|
| 9,659,416 | B2 | 5/2017 | Tanaka et al. |
| 9,923,250 | B2 | 3/2018 | Shiraishi et al. |
| 9,956,896 | B2 | 5/2018 | Tanaka et al. |
| 2016/0129817 | A1 | 5/2016 | Shimizu et al. |
| 2016/0141733 | A1 | 5/2016 | Shiraishi et al. |
| 2016/0325656 | A1 | 11/2016 | Ziolek et al. |
| 2017/0144574 | A1 | 5/2017 | Tanaka et al. |

FOREIGN PATENT DOCUMENTS

| | | |
|---|---|---|
| JP | 10193958 | 7/1988 |
| WO | 2015186329 A1 | 12/2015 |

OTHER PUBLICATIONS

International Search Report and Written Opinion for International Application No. PCT/US2017/028442 dated Aug. 3, 2017.
Japanese Office Action for Japanese Application No. 2018-554559 dated Nov. 26, 2019.

* cited by examiner

CLIMATE CONTROLLED SEAT WITH A THERMAL CONDITIONING DEVICE WHICH IS CONTROLLED BY DETERMINING A HEAT FLUX

RELATED APPLICATIONS

This application claims priority to U.S. Provisional Application Ser. No. 62/324,692, filed Apr. 19, 2016 and to U.S. Provisional Application Ser. No. 62/446,093, filed Jan. 13, 2017, which are each incorporated by reference in their entirety herein.

FIELD OF THE DISCLOSURE

This disclosure relates to climate controlled seats and, more particularly, to a method of determining a heat flux rate and heat flux inversion point, and adjusting operating parameters of the seat to control the heat flux. Heat flux control can reduce overcooling (or overheating) of the occupant, and thereby improve occupant comfort and inhibit occupant discomfort. This disclosure also relates to an autonomous seat climate control system and seat for performing this method.

BACKGROUND

Vehicle manufacturers are becoming increasingly focused on providing vehicle occupant thermal comfort without requiring continual input from the occupant. Typically, an occupant must adjust settings for the vehicle's HVAC and seating heating and cooling settings. It is desirable to provide an autonomous climate control system that automatically senses occupant thermal comfort and adjusts various aspects of the climate control system based upon current thermal conditions to provide increased occupant thermal comfort.

SUMMARY

In one embodiment, a method of autonomously providing thermal comfort to an occupant in contact with a component includes the step of determining a heat flux between the component and the occupant. A heat flux inversion is determined using the heat flux. The heat flux inversion corresponds to a change in occupant thermal comfort. A thermal conditioning device is controlled based upon the heat flux inversion to maintain a desired heat flux.

In a further embodiment of any of the above, the controlling step includes a rapid thermal response zone, followed by a throttle zone, followed by an overshoot zone, followed by an oscillation zone. The rapid thermal response zone includes controlling the thermal conditioning device to rapidly approach the heat flux inversion. The throttle zone includes controlling the thermal conditioning device to more slowly approach the heat flux inversion than the rapid thermal response zone. The overshoot zone includes controlling the thermal conditioning device to cross an inversion point. The oscillation zone includes controlling the thermal conditioning device to oscillate about the inversion point.

In a further embodiment of any of the above, the component is cooled with the thermal conditioning device to generate the heat flux inversion, and the controlling step includes decreasing the cooling provided by the thermal conditioning device in response to the determined heat flux inversion.

In a further embodiment of any of the above, the component is heated with the thermal conditioning device to generate the heat flux inversion, and the controlling step includes decreasing the heating provided by the thermal conditioning device in response to the determined heat flux inversion.

In a further embodiment of any of the above, the component is a seat with an aesthetic cover, and a heat flux sensor is at least one of supported on the aesthetic cover and arranged beneath the aesthetic cover.

In a further embodiment of any of the above, the heat flux measuring step includes inferring a heat flux between a seated occupant and the seat.

In a further embodiment of any of the above, the heat flux determining step includes inferring a heat flux between the seated occupant and the seat using a temperature sensor.

In a further embodiment of any of the above, the heat flux inversion corresponds to a thermal equilibrium point between the occupant and the component.

In a further embodiment of any of the above, the controlling step includes maintaining the desired heat flux within a desired heat flux range.

In a further embodiment of any of the above, the desired heat flux range is $-30$ W/m$^2$ to $20$ W/m$^2$.

In a further embodiment of any of the above, the desired heat flux range is $-5$ W/m$^2$ to $5$ W/m$^2$.

In a further embodiment of any of the above, the desired heat flux range is adjusted to a different desired heat flux range in response to a user input.

In a further embodiment of any of the above, the adjusting step includes adjusting an oscillation interval within the desired heat flux range.

In a further embodiment of any of the above, the seat thermal conditioning device is controlled to maintain a desired seat surface temperature.

In a further embodiment of any of the above, the desired seat surface temperature is in a range of $32.0°$ C. to $35.5°$ C.

In a further embodiment of any of the above, the seat thermal conditioning device is controlled to maintain a user skin temperature in a range of $30°$ C. to $36°$ C.

In a further embodiment of any of the above, the user skin temperature maintaining step is performed according to the equation $$T_S = \frac{T_B + qt}{k + qF_{cl}},$$

where $T_S$ is skin temperature, $T_B$ is measured temperature at a back of seat upholstery, q is heat flux between occupant and seat back, t is seat upholstery thickness, k is seat upholstery thermal conductivity, and $F_{cl}$ is clothing thermal conductivity for typical season attire.

In a further embodiment of any of the above, a total amount of heat flux between the component and the occupant is determined, and the controlling step includes regulating the component thermal conditioning device to prevent at least one of overheating and overcooling of the occupant based upon the total amount of heat flux.

In a further embodiment of any of the above, the component is a seat having a seat back and a seat bottom each including at least one of the thermal conditioning devices, and the controlling step includes asymmetrically regulating the thermal conditioning devices based upon the heat flux inversion.

In a further embodiment of any of the above, at least one heat flux sensor is arranged only in the seat back of the seat, and the thermal conditioning device in the seat bottom is controlled based upon the heat flux sensor in the seat back.

In a further embodiment of any of the above, the component is a steering wheel.

In another embodiment, an autonomous seat climate control system includes a seat with a heat flux sensor configured to detect a heat flux relating to occupant thermal comfort provided by the seat. The autonomous seat climate control system also includes a seat thermal conditioning device, and a controller configured to command the seat thermal conditioning device in response to the detected heat flux.

In a further embodiment of any of the above, the controller is configured to command the thermal conditioning device in response to a heat flux inversion, and the controller is configured to command the thermal conditioning device to maintain a desired heat flux once the heat flux inversion has been detected.

In a further embodiment of any of the above, the seat has an aesthetic cover, and the heat flux sensor is supported on the aesthetic cover.

In a further embodiment of any of the above, the heat flux sensor is arranged in a join seam of the aesthetic cover.

In a further embodiment of any of the above, the seat has an aesthetic cover, and the heat flux sensor is arranged beneath the aesthetic cover.

In a further embodiment of any of the above, the seat includes a breathable backing, and the heat flux sensor is arranged between the breathable backing and the aesthetic cover.

In a further embodiment of any of the above, the seat includes a cushion that provides a fluid passage, the thermal conditioning device is in fluid communication with the fluid passage, and the heat flux sensor is aligned above the fluid passage.

In a further embodiment of any of the above, the thermal conditioning device includes a thermoelectric device and a blower.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
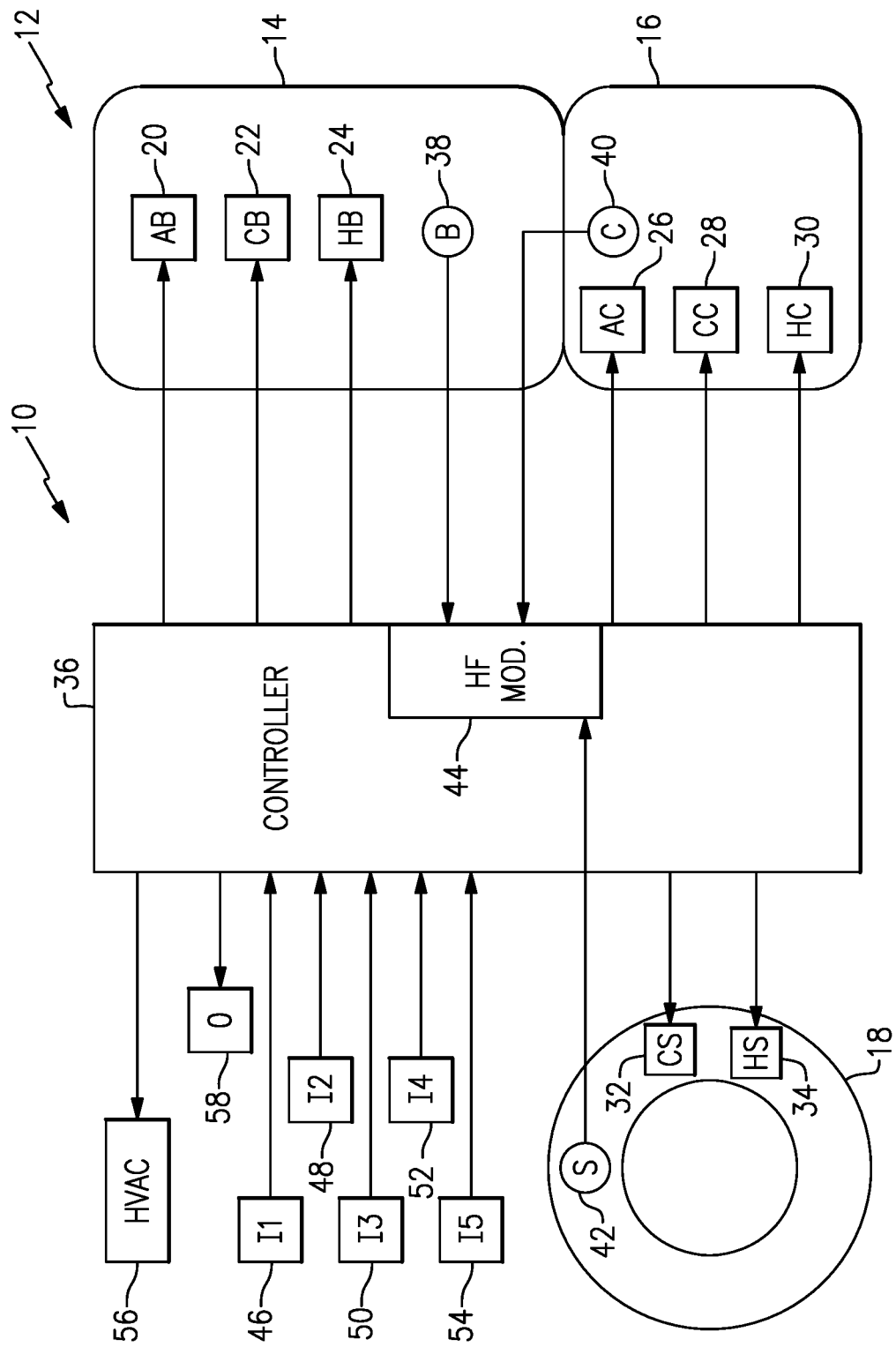
FIG. 1 is a schematic view of a seat climate control system.

An example seat climate control system 10 is illustrated in FIG. 1. The system 10 includes a seat 12 having a seat back 14 and a seat cushion 16 or bottom. In the example, the system 10 also includes a steering wheel 18. A seated occupant within a vehicle is in engagement with the seat 12 and steering wheel 18 throughout vehicle operation. As a result, these components contribute considerably to the comfort of the seated occupant. It is desirable to provide effective heating and/or cooling of the occupant through the seat 12 and/or steering wheel 18, for example, autonomously with little or no user input.

Figure 7:
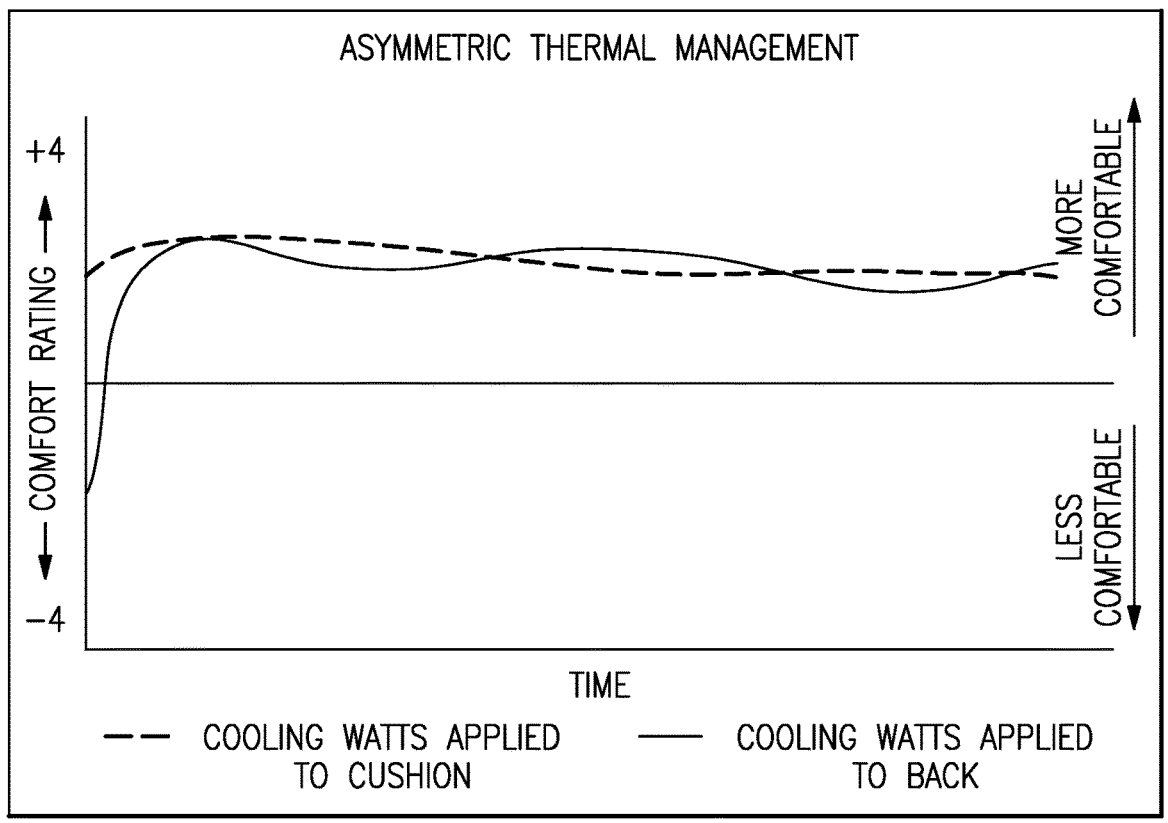
FIG. 7 is a graph depicting asymmetrical thermal management of occupant comfort for a seat back and a seat cushion or bottom.

To this end, each of the seat back 14, seat cushion 16 and steering wheel 18 includes at least one thermal conditioning device. In the example of the seat back 14, a cooling device 22, a heating device 24 and an air blower 20 may be provided to heat and/or cool the seat. Similarly, the seat cushion 16 includes a cooling device 28, a heating device 30 and/or an air blower 26 to heat and/or cool the seat cushion. The seat back 14 and seat cushion 16 may be controlled asymmetrically by a controller 36 such that the seat back 14 and seat cushion 16 provide differing amounts or rates of heating and/or cooling to the occupant (see, e.g., FIG. 7) to address different thermal comfort needs. In one example, the rate of cooling provided by the seat back 14 is greater than the rate of cooling provided by the seat cushion 16 based on or in proportion to differing metabolic rates of torso and legs. The steering wheel 18 includes a cooling device 32 and/or a heating device 34 to provide heating and/or cooling to the occupant's hands. In one example, one or more of the cooling devices may be provided by a thermoelectric device that operates based upon the Peltier effect in use with the blower 20 and/or 26. It should be understood that not all components in contact with the occupant may be thermally conditioned, and these components may be conditioned using more or fewer thermal conditioning devices than described.

Heat flux sensors 38, 40, and 42 are provided in the seat back 14, seat cushion 16 and/or optionally steering wheel 18, and measure the rate of heat energy transfer per unit time and per unit area between the occupant and the seat back 14, seat cushion 16 and/or steering wheel 18 respectively. By measuring the heat flux between the occupant and the seat 12, the heat flux sensors 38, 40, and 42 can be used to provide an estimate of the occupant's thermal comfort. The heat flux sensors 38, 40, 42 are in communication with a heat flux module 44 provided in the controller 36. Empirical data gathered to correlate the heat flux measurements to the comfort of a variety of occupants or occupant types (e.g., male and female occupants) can be stored in memory for retrieval by the heat flux module 44 to accurately model the climate controlled system based upon environmental conditions and numerous inputs 46-54.

The controller 36 may include a processor and non-transitory memory where computer readable code for controlling operation is stored. In one example, the controller 36 is integrated within the seat 12, although the controller 36 or portions thereof may be located remotely.

In terms of hardware architecture, such a controller can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller 36.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The input/output devices that may be coupled to system I/O Interface(s) may include input devices, for example, but not limited to, a scanner, microphone, camera, proximity device, etc. Further, the input/output devices may also include output devices, for example but not limited to a display, etc. The input/output devices may further include devices that communicate both as inputs and outputs, for instance but not limited to, a modulator/demodulator (for accessing another device, system, or network), a radio frequency (RF) or other transceiver, a bridge, a router, etc.

When the controller 36 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

The controller 36 is communication with the various inputs 46-54, which may provide information relating to ambient temperature, ambient humidity, seat geometry, conditioning zone, occupant humidity, component temperature, occupant temperature, and/or user configuration inputs such as personal preferences, gender, body type, height, weight and/or metabolic rate of the occupant.

The controller 36 may also command other thermal conditioning devices in the vehicle, such as the vehicle's HVAC unit 56 and other devices 58, such as heated and/or cooled floor mats, shift knob, door panels, armrests, headliner, etc.

The heat flux sensor(s) 38, 40, 42 can measure the heat flux in one or more conventional manners. In one example, the heat flux sensors can measure the temperature on two opposing sides of a material of known thermal conductivity and thickness, and thereby provide a measure of the heat flux.

Heat flux sensors are commercially available from a variety of suppliers, such as Mahoele Messtechnik GmbH, Omega Engineering, Incorporated, and Greenteg AG. The heat flux sensors 38, 40, 42 are typically passive devices with a μV output that requires amplification.

Any suitable configuration of heat flux sensor may be used to directly measure, or at least infer, the heat transfer between the occupant and the component, such as the seat 12 and steering wheel 18. It is desirable to position the heat flux sensor in as close proximity to the occupant as possible. The heat flux sensor may be arranged in the seat 12 directly beneath the occupant's legs and/or back. The further the heat flux sensor is arranged from the occupant, the more difficult it may become to accurately quantify the heat flux between the occupant and the component surface.

Figure 2:
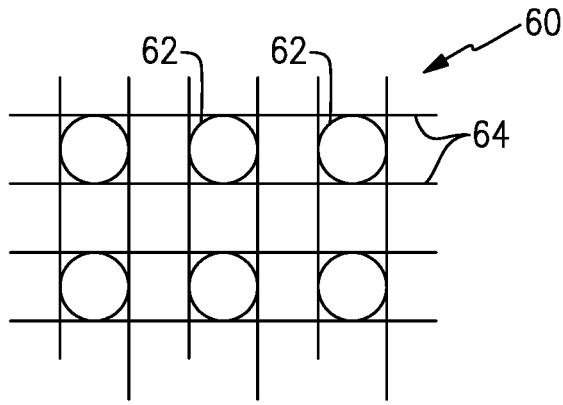
FIG. 2 is a portion of a heat flux sensor mat embodiment.

A single heat flux sensor may be used in one or more of the desired surfaces. Multiple heat sensors may also be used to take discrete measurements at various locations relative to the occupant, and the sensors may be arranged in an array to provide an estimate of the heat flux over an entire conditioning area. In one example shown in FIG. 2, a mat 60 is provided with an array of heat flux sensors 62 supported by a lattice 64.

The occupant's torso is most indicative of a particular occupant's physiology, metabolic rate, and comfort needs. Thus, preferably at least one heat flux sensor is used to measure the heat flux between the occupant and the seat back 14. In one example, a single heat flux sensor 38 may be arranged in the seat back 14 to provide heat flux information relating to the occupant with respect to both of the seat back 14 and the seat cushion 16. In this configuration, the thermal conditioning device(s) of the seat back 14 and seat cushion 16 are controlled based upon the heat flux sensor 38 in the seat back 14. Optionally, one or more heat flux sensors 40 may also be used in the seat cushion 16 in addition to the seat back 14 to enable independent monitoring and adjustment of the conditioning provided by the seat back 14 and seat cushion 16. It should be understood that more or fewer heat flux sensors may be used. For example, only one heat flux sensor may be provided in each of the seat back 14 and the seat cushion 16.

Figure 3:
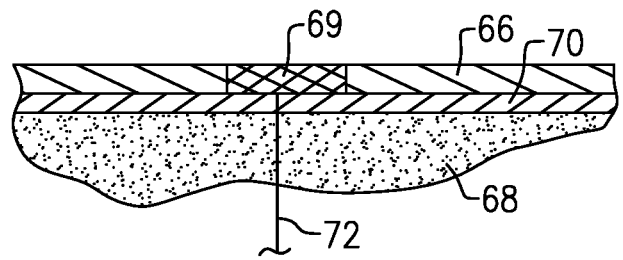
FIG. 3 is a portion of a seat with a heat flux sensor supported on an aesthetic cover.

Referring to the example shown in FIG. 3, the seat 12 includes an aesthetic cover 66 with a soft backing layer 70 arranged beneath, for example, a breathable backing that is supported by a cushion 68. Heat flux sensor 69 is supported on the aesthetic cover 66, and may be provided by a styling element such as a decorative emblem or logo. The heat flux sensor 69 is connected to the controller 36 by one or more wires 72.

Figure 4:
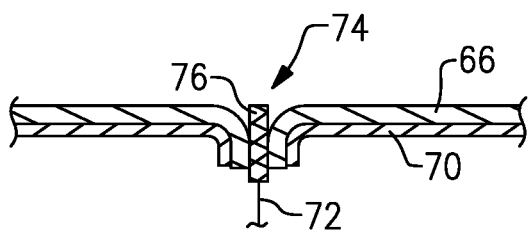
FIG. 4 is a portion of a seat with a heat flux sensor arranged in a join seam of an aesthetic cover.

Another example configuration is shown in FIG. 4. A heat flux sensor 76 is arranged in a join seam 74 of the aesthetic cover 66.

Figure 5:
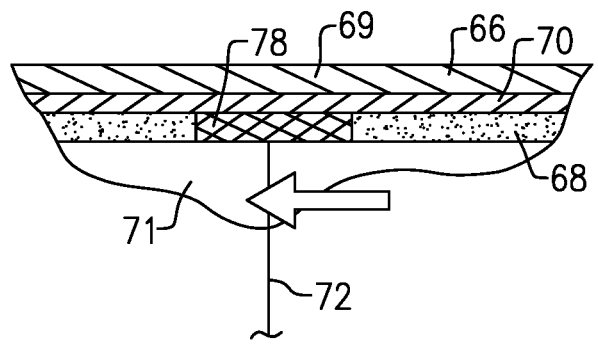
FIG. 5 is a portion of a seat with a heat flux sensor arranged beneath an aesthetic cover.

Yet another example configuration is shown in FIG. 5 in which a heat flux sensor 78 is arranged beneath the aesthetic cover 66. The heat flux sensor 78 may also be arranged beneath the breathable backing layer 70 and in fluid communication with the fluid passage 71 through which condition fluid (e.g., air) flows to effectuate a desired heat transfer between the seat 12 and the occupant.

In various embodiments, a seat climate control system according to the present disclosure actively measures the heat flux between the seat 12 and the occupant and uses the measured heat flux to control the output power of the thermal conditioning devices (e.g., heating device, cooling device, and/or air blower) to keep the occupant in a state of thermal comfort. In an optional feature, the seat climate control system 10 can alternately increase and decrease the output power of the thermal conditioning devices to vary the heat flux at predetermined rates and/or within a predetermined range in a cyclical manner and thereby actively stimulate or inhibit stimulation of the occupant's thermal receptors, which may be done to enhance occupant comfort. In such a configuration, the heat flux may be controlled to stimulate thermal receptors associated with the conditioning mode (e.g., cold receptors associated with a cooling mode) while inhibiting stimulation of thermal receptors associated with the opposite mode (e.g., hot receptors associated with a heating mode). Example advantages of the seat climate control system in this disclosure focuses on cooling (e.g., FIG. 8), but it will be understood a heating algorithm according to the present disclosure can also be used and should be similar in nature to the cooling examples.

In various examples, one or more heat flux sensors are used to detect a "heat flux inversion" point, which is indicative of the point in time at which the support surface of the seat is no longer colder or hotter than an adjacent surface of the occupant, and heat transfer between the occupant and the seat 12 switches direction (i.e., inverts). It has been determined that excessive temperature differences and heat flux can lead to occupant discomfort.

For example, when an occupant enters a vehicle that has been soaking in heat, the seat 12 may be at a temperature well above the temperature of the occupant and heat flows initially from the hotter seat to the cooler occupant creating or increasing thermal discomfort to the occupant. A climate control system may address this issue by automatically controlling the seats 12 to a maximum cooling setting during an initial period after startup to lower the temperature of the seats 12 quickly and reach the heat flux inversion point in the shortest amount of time. But, continued operation in this setting after the heat flux inversion point may result in an overcooling condition after a period of time in which case the occupant would manually change a setting to reduce seat cooling. By instead measuring heat flux and determining the heat flux inversion, the seat thermal conditioning device power can be reduced at a predetermined time relative to the heat flux inversion point. In various examples the power can be reduced prior to, at the same time as, or following the heat flux inversion point. In such configurations, power can be adjusted based on the direction of the flow of heat between the seat 12 and the occupant, and as the flow of heat substantially decreases, approaches or reaches an equilibrium point with the occupant.

One example method or algorithm for cooling an occupant with a preexisting undesirably warm seat is provided below:

```
If T_surface > T_occupant and T_ambient > T_limit => start max cool mode
When T_surface ~ T_occupant and heat flux rate ~ 0 => monitor and maintenance mode
Adjust cool mode setting to maintain T_occupant > T_surface until Heat_Flux_Max
    reached, where Heat_Flux_Max equates to the point where negative heat flux is at the
    limit of comfortable/uncomfortable
After Heat_Flux_Max reached, limit cooling power and air flow to maintain between -
    HFD_min and -HFD_max
Variation: After Heat_Flux_Max reached, pulse cooling power to maintain between -
    HFD_min and -HFD_max over set time cycle (i.e., Real Time Strategy; Variation
    considers repeated thermal stimulation based on heat flux monitoring and feedback,
    e.g., oscillation shown in Figures 8 and 11)
Variation: After heat flux rate ~0 is reached continue cooling at same or different cooling
    power for period of time DT_cooling. After this stop actively cooling for period of time
    DT_idle. Continue cycling with fixed or variable periods of time DT_cooling and
    DT_idle.
```

The same principle may be used to prevent overheating when the vehicle seat 12 is initially too cold.

Thus, the disclosed system is used to provide autonomous adjustment of one or more thermal conditioning devices to provide the desired thermal comfort and sensation as expressed in, for example, the Berkeley Comfort Model.

Figure 6A:
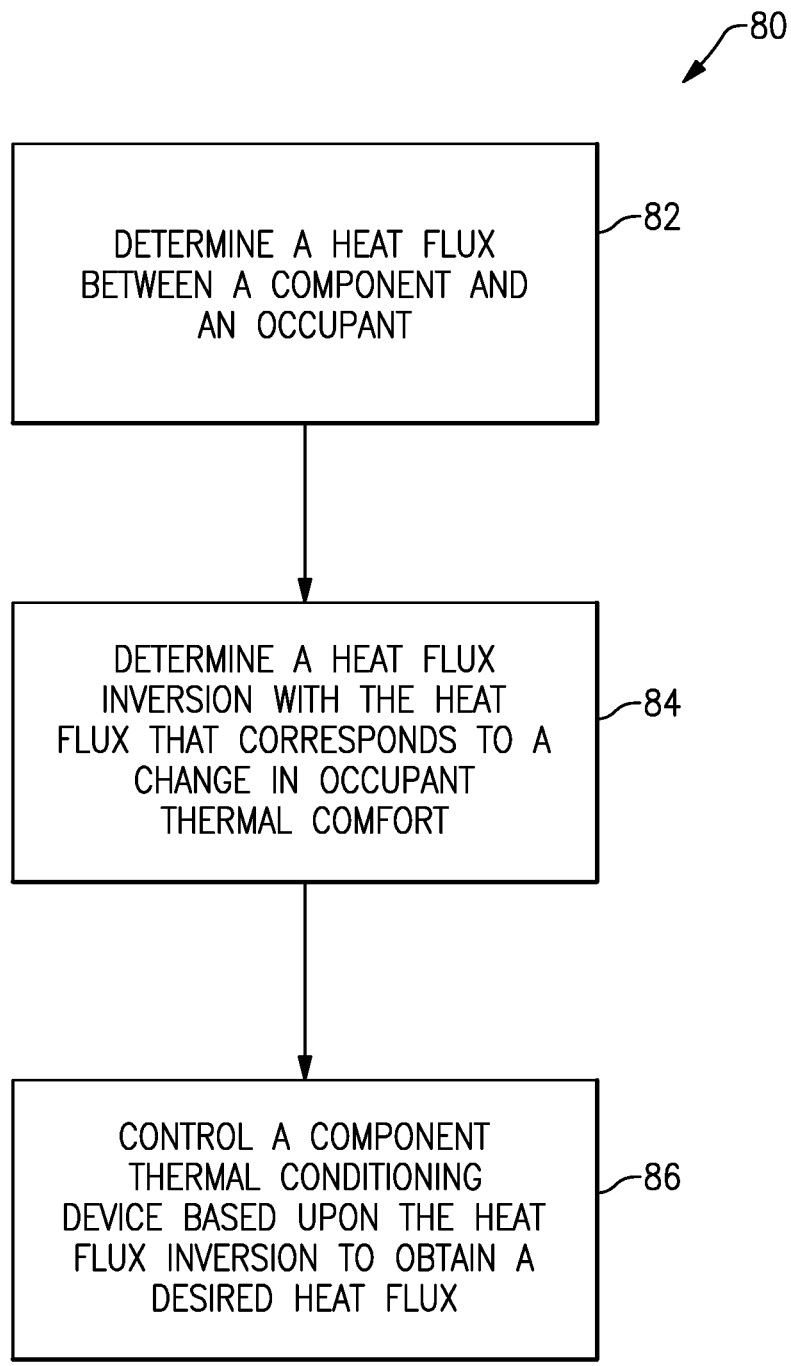
FIG. 6A is a flowchart depicting a method of autonomously providing thermal comfort to an occupant in contact with a component.

FIG. 6A illustrates one example control method 80 of autonomously providing thermal comfort to an occupant in contact with a component, such as the seat 12 and steering wheel 18. A heat flux is determined between a component and an occupant, as indicated at block 82. A heat flux inversion is determined using the heat flux at block 84. The heat flux inversion corresponds to a change in occupant thermal comfort and corresponds to a thermal equilibrium point between the occupant and the component, for example when the heat flux is at or near 0 W/m$^2$. A component thermal conditioning device, such as the heating device (e.g., 24, 30, 34), cooling device (e.g., 22, 28, 32), and/or air blower (e.g., 20, 26), is controlled based upon the measured or inferred heat flux and the heat flux inversion to obtain a desired heat flux, as indicated in block 86. During periods when the heat flux is in an opposite direction than that desired in the conditioning mode, the thermal conditioning component may be operated at a maximum setting. During periods at, near, or following the heat flux inversion, the thermal conditioning component may be operated at a reduced setting. Heat flux can be regulated to provide a desired thermal comfort to the occupant without overheating or overcooling. In various examples, a total amount of heat transfer between the component and the occupant prior to and/or after the heat flux inversion is determined based on the heat flux over time. The thermal conditioning device is regulated to prevent occupant overheating or overcooling based upon the total amount of heat to and from the occupant. Control based on the total or net amount of heat transfer can be advantageous, since there is generally a heat transfer limit for occupant thermal comfort. Moreover, in situations where substantial heat transfer occurs in the opposite direction before the inversion point, it may take a longer period of time after the inversion point for the occupant to reach comfort. Therefore, it may be desirable to continue operation of the thermal conditioning component at a maximum setting for longer periods of time. In other words, the duration of operation at the maximum setting may be proportional to the amount of thermal transfer prior to the inversion point. Beyond the total amount of heat transfer, the occupant is expected to have had too much heat exit (when cooling) or enter (when heating) the occupant's body, which creates thermal discomfort.

Although the heat flux inversion occurs at 0 W/m$^2$, i.e., the inversion point, the control is not limited to controlling the thermal conditioning device at the inversion point. That is, the inversion point can be used as a reference point. For example, as the heat flux approaches the inversion point, the thermal conditioning device may be controlled in a different manner as discussed above.

Figure 6B:
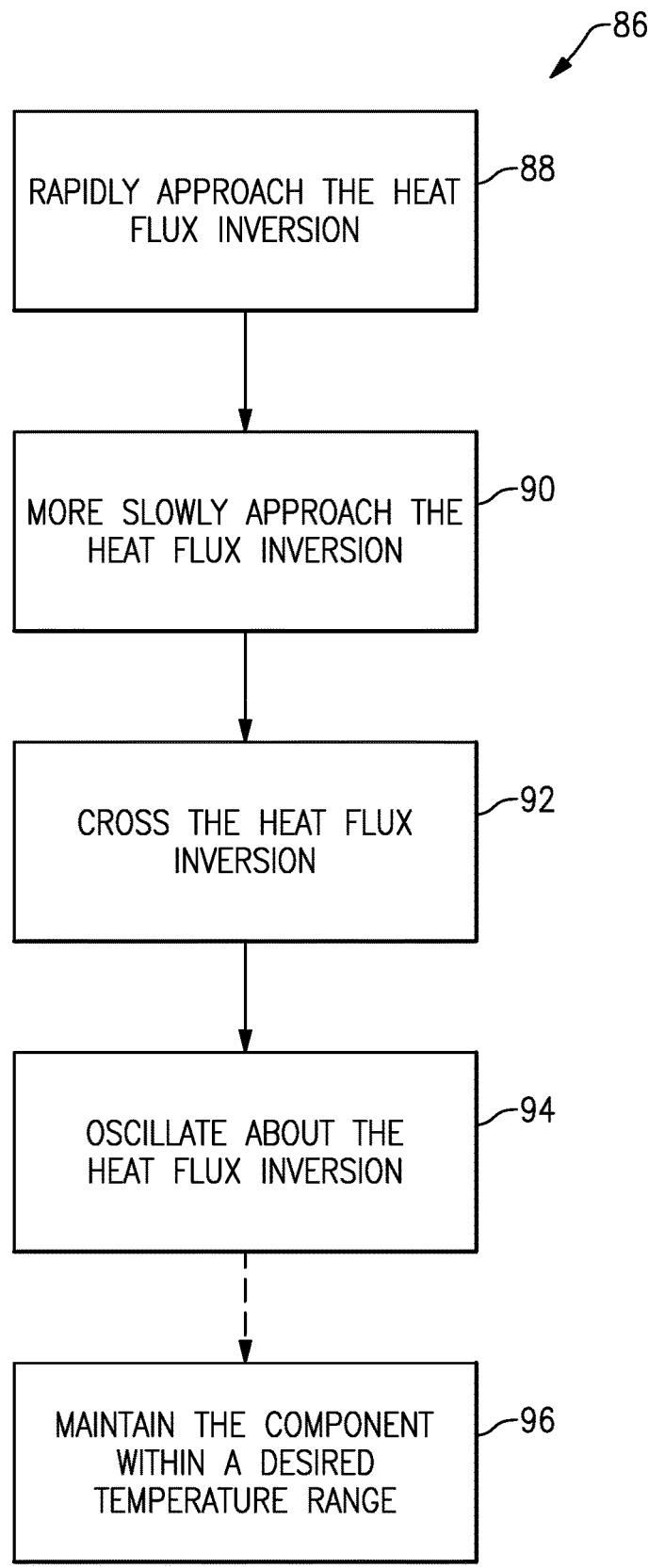
FIG. 6B is a flowchart depicting a method of controlling a thermal conditioning device based upon a heat flux inversion.
Figure 8:
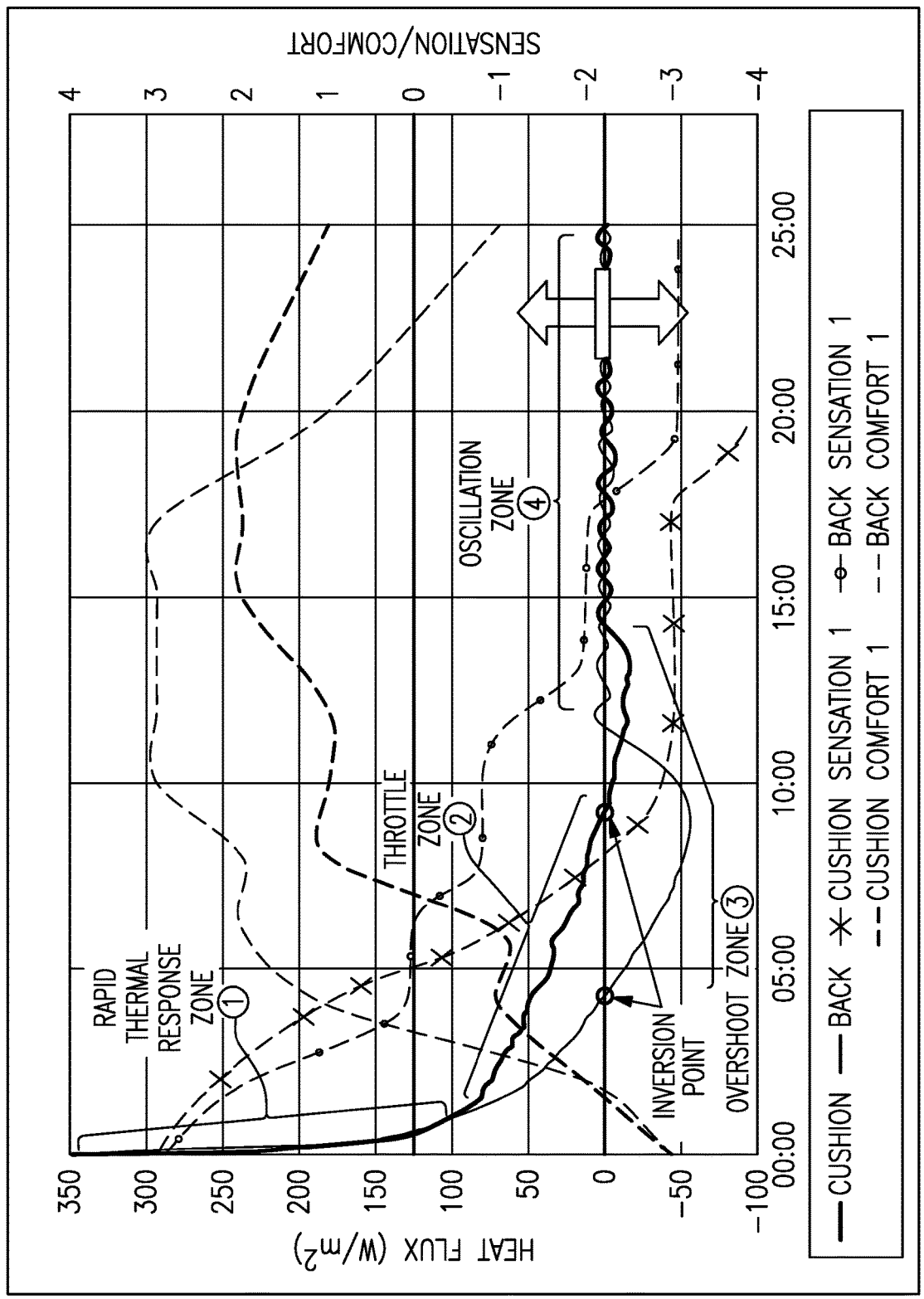
FIG. 8 is a graph showing one example approach to controlling a thermal conditioning device based on various zones to maintain a desired heat flux.

Referring to FIG. 6B, in one example, the desired heat flux is obtained by rapidly approaching the heat flux inversion, as indicated in block 88, in a rapid thermal response zone 1 shown in FIG. 8. The heat flux inversion is more slowly approached, as indicated at block 90 and shown by the throttle zone 2 in FIG. 8, e.g., by decreasing cooling (or heating when warming an occupant). In one example control strategy, once −30 w/m$^2$ is reached, the cooling power is throttled back (e.g., throttle zone 2) to allow the heat flux to begin rising back toward the heat flux inversion point (0 W/m$^2$).

In some cases, the heat flux may vary so that the inversion point is crossed and then doubled back into a positive heat flux if the net heat transfer is positive (body heat generation is more than cooling watt removal) and when there is still enough residual heat in the seat 12 and in the ambient environment. For example, measured heat flux can reach −30 W/m$^2$ indicating that a cooled seat surface is removing heat from the occupant at a rate considered comfortable. At this instance in time it is possible that the ambient temperature and temperature of seat components which are not conditioned is such that upon disengaging, a cooling system temperature of the seat surface will increase above the skin temperature and heat flux will reverse flow—we will again cross the inversion point. Crossing the inversion point will again activate the cooling system and prevent the occupant from feeling discomfort. Similarly, in case of cold vehicle and cold seat heating, devices can be used to prevent the occupant from ever feeling a cold sensation as a cold thermal mass of the seat 12 is being managed by heating devices by using feedback from heat flux sensors (e.g., 38, 40, 42).

Once the heat flux inversion point has been crossed, as indicated in block 92, the heat flux passes through an overshoot zone 3 (FIG. 8) before the heat flux inversion point is again approached by slowing, shutting down, or reversing heating or cooling in the component. Long periods of steady state heat flux, even with occupant thermal comfort achieved, may result in occupant discomfort. So, once the inversion point is again reached, the thermal conditioning device is used to oscillate about the heat flux inversion, as indicated at block 94 and shown by the oscillation zone 4 in FIG. 8. In various examples, oscillation of the heat flux is controlled to selectively stimulate and/or inhibit stimulation of the occupant's thermal receptors (see also FIG. 11). Controlling heating or cooling at a fixed heat flux value may result in long term drift of temperature at the interface between occupant and seat and result in discomfort. Oscillating the heat flux may eliminate the need for a temperature sensor which would control for overheating or overcooling. The controller 36 can be used to adjust cooling or heating power in such a way to produce heat flux direction changes, thus preventing long term discomfort.

Conventional seat climate control systems use seat temperature or a temperature of the conditioning device alone to control operation. Using temperature data alone may not provide an optimal means of thermal comfort management, which is why the disclosed heat flux measurement is advantageous and desirable. But, some temperature measurement still may be desired as a check on heating and cooling limits. Temperature may change over time while the heat flux is held constant. To this end, conditioning device temperature, seat surface temperature, and/or occupant skin temperature may be used to maintain the component with a desired temperature range, as indicated in block 96, for example, and as a check on heat flux sensor drift.

In one example, the seat thermal conditioning device is controlled to maintain a desired seat surface temperature, for example, in a range of 32.0° C. to 35.5° C. In another example, the seat thermal conditioning device is controlled to maintain a user skin temperature in a range of 30° C. to 36° C. The user skin temperature may be estimated or inferred based upon the equation $$T_S = \frac{q}{k/t + F_{cl}} + T_B,$$

where $T_S$ is skin temperature, $T_B$ is measured temperature at the back 14 of seat upholstery, q is heat flux between an occupant and seat back 14, t is seat upholstery thickness, k is seat upholstery thermal conductivity, and $F_{cl}$ is clothing thermal conductivity for typical season attire. In this example control parameter is $T_S$ and it is inferred from two measured values heat flux q and temperature $T_B$. An occupant recognition system (e.g., IR camera) and local weather forecast information can be used to improve $F_{cl}$ estimates.

Figure 9:
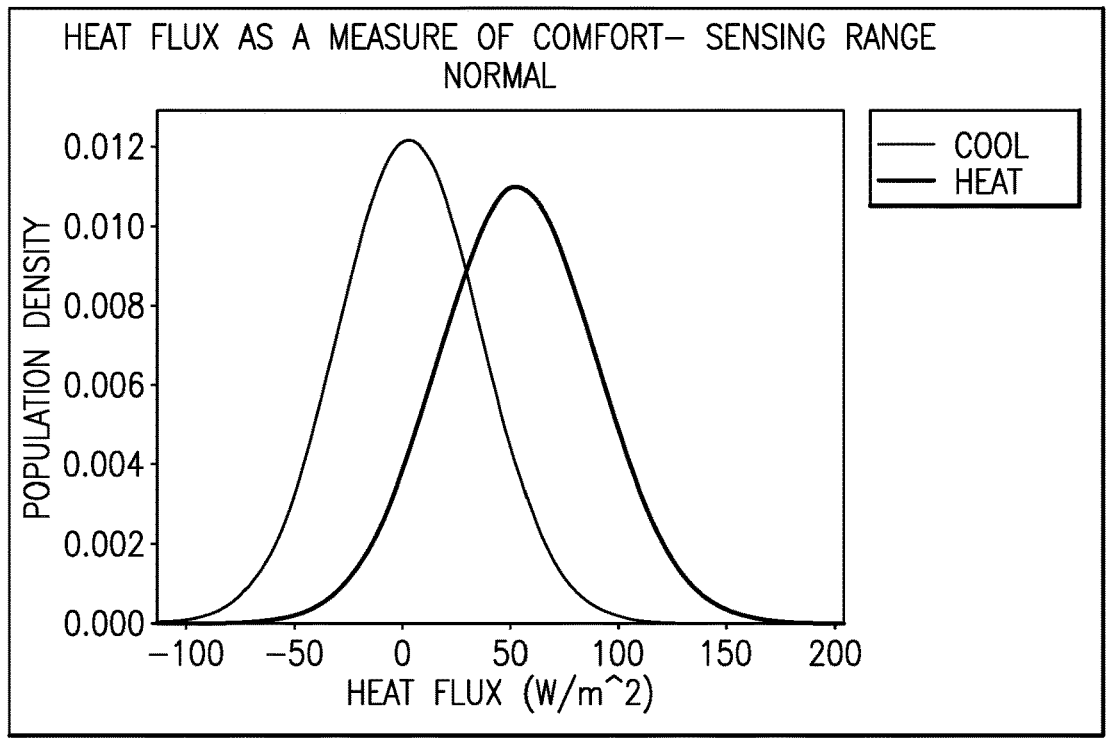
FIG. 9 is a graph illustrating heat flux as a measure of occupant thermal comfort for heating and cooling an occupant for a population of occupants.

As shown in FIG. 9, a typical desired heat flux for heating and cooling scenarios are different than one another. Moreover, desired heat flux which is preferred by occupants differs amongst the population. Thus, in cooling applications a desired heat flux that covers most of the population initially is in a range of −30 W/m$^2$ to 20 W/m$^2$. As an example, it may be desirable to achieve for a time a heat flux of −30 W/m$^2$ constant for successful cooling, or positive 20 W/m$^2$ for successful heating, which is the population in which 50% of the population would be comfortable. In one example, as illustrated in FIG. 8, the desired heat flux is maintained within a tighter window of −5 W/m$^2$ to 5 W/m$^2$. In another example, it may be desirable to maintain 0 W/m$^2$ constant.

Figure 10:
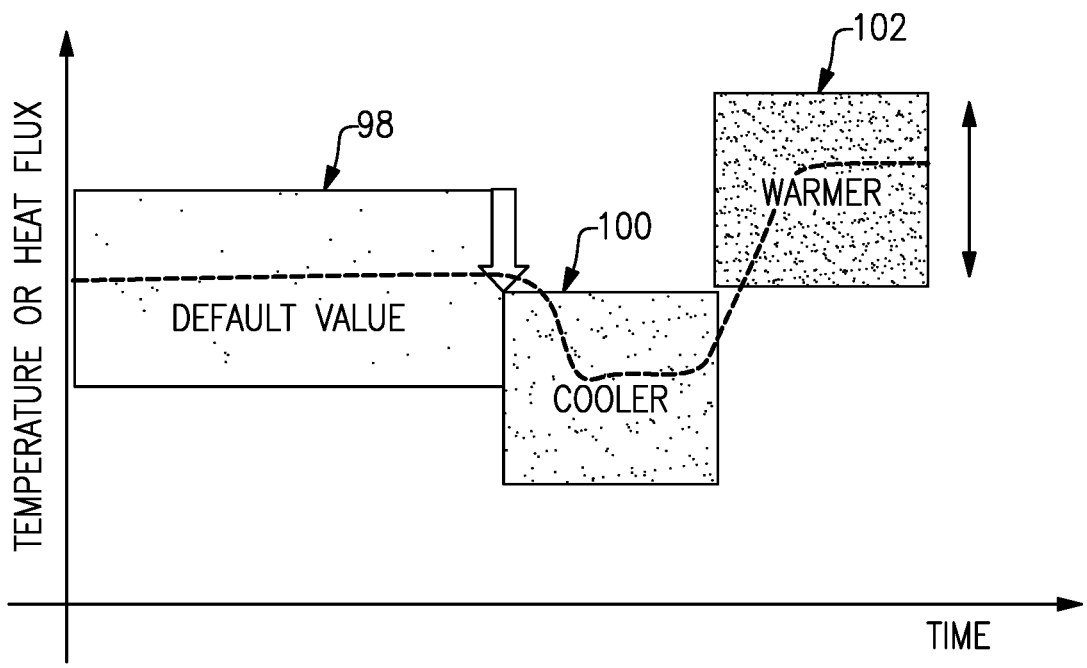
FIG. 10 is a graph illustrating adjusting a desired heat flux range in response to a user input.
Figure 11:
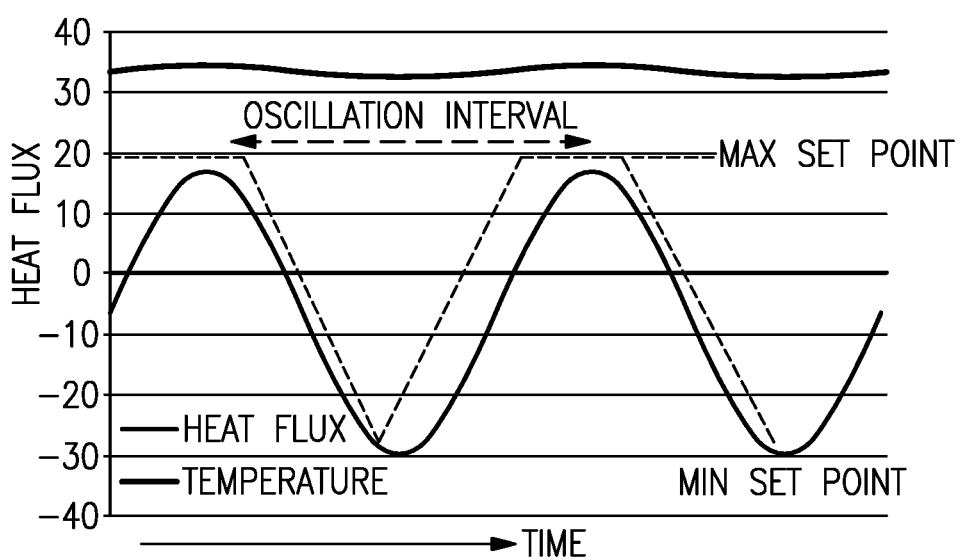
FIG. 11 is a graph illustrating oscillating the heat flux about an inversion point within a desired heat flux range.

Referring now to FIG. 10, these desired heat flux ranges can be provided in the controller 36 as a default window 98 having a default maximum and minimum that is configured to account for the metabolic rate of the occupant. For example, the heat flux is varied based on an amount of heat produced by the occupant (i.e., metabolic rate), for example proportionately, and within a range relative to and optionally that encompasses the metabolic rate. A user may adjust the desired heat flux range from the default window 98 to a cooler window 100 or a warmer window 102, providing a customized different desired heat flux range, as shown in FIG. 10. The controller 36 may adjust these windows not only in response to user input, but also anticipating different desired heat flux windows based upon gender, body type, height, weight, and/or metabolic rate of the occupant. In addition to adjusting the heat flux windows by shifting the maximum and minimum heat flux set points, an oscillation interval may also be varied, as illustrated in FIG. 11.

The rate of change of heat flux, and therefore the rate of temperature change, can be adjusted as a function of an initial wetness or occupant sweat rate. Wetness and sweating can be detected by measuring the humidity at the occupant/seat interface or by measuring humidity of air pulled from the occupant/seat interface. Higher rates of temperature change (fast cooling) will result in an uncomfortable feeling of wetness to some occupants. To avoid this sensation, the system can maintain slightly positive heat flux values at longer periods of time and have slower increases of cooling (longer time to get to a negative heat flux) when the system detects a sweating occupant.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that reason, the following claims should be studied to determine their true scope and content.

What is claimed is:

1. A method of autonomously providing thermal comfort to an occupant in contact with a component, the method comprising the steps of:
   determining a heat flux between the component and the occupant;
   determining a heat flux inversion using the heat flux, the heat flux inversion corresponds to a change in occupant thermal comfort; and
   controlling a thermal conditioning device based upon the heat flux inversion to maintain a desired heat flux, wherein the component is a seat having a seat back and a seat bottom each including at least one of the thermal conditioning devices, and the controlling step includes asymmetrically regulating the thermal conditioning devices based upon the heat flux inversion.

2. A method of autonomously providing thermal comfort to an occupant in contact with a component, the method comprising the steps of:
   determining a heat flux between the component and the occupant;
   determining a heat flux inversion using the heat flux, the heat flux inversion corresponds to a change in occupant thermal comfort; and
   controlling a thermal conditioning device based upon the heat flux inversion to maintain a desired heat flux, wherein the controlling step includes a rapid thermal response zone, followed by a throttle zone, followed by a overshoot zone, followed by an oscillation zone, wherein the rapid thermal response zone includes controlling the thermal conditioning device to rapidly approach the heat flux inversion, the throttle zone includes controlling the thermal conditioning device to more slowly approach the heat flux inversion than the rapid thermal response zone, the overshoot zone includes controlling the thermal conditioning device to cross an inversion point, and the oscillation zone includes controlling the thermal conditioning device to oscillate about the inversion point.

3. The method according to claim 2, comprising the step of cooling the component with the thermal conditioning device to generate the heat flux inversion, and the controlling step includes decreasing the cooling provided by the thermal conditioning device in response to the determined heat flux inversion.

4. The method according to claim 2, comprising the step of heating the component with the thermal conditioning device to generate the heat flux inversion, and the controlling step includes decreasing the heating provided by the thermal conditioning device in response to the determined heat flux inversion.

5. The method according to claim 1, wherein the seat has an aesthetic cover, and a heat flux sensor is at least one of supported on the aesthetic cover and arranged beneath the aesthetic cover.

6. The method according to claim 5, wherein the heat flux measuring step includes inferring a heat flux between a seated occupant and the seat.

7. The method according to claim 6, wherein the heat flux determining step includes inferring a heat flux between the seated occupant and the seat using a temperature sensor.

8. A method of autonomously providing thermal comfort to an occupant in contact with a component, the method comprising the steps of:
   determining a heat flux between the component and the occupant by determining a total amount of heat flux between the component and the occupant;
   determining a heat flux inversion using the heat flux, the heat flux inversion corresponds to a change in occupant thermal comfort; and
   controlling a thermal conditioning device based upon the heat flux inversion to maintain a desired heat flux, and the controlling step includes regulating the component thermal conditioning device to prevent at least one of overheating and overcooling of the occupant based upon the total amount of heat flux.

9. The method according to claim 8, wherein the controlling step includes maintaining the desired heat flux within a desired heat flux range.

10. The method according to claim 9, wherein the desired heat flux range is $-30$ $W/m^2$ to $20$ $W/m^2$.

11. The method according to claim 10, wherein the desired heat flux range is $-5$ $W/m^2$ to $5$ $W/m^2$.

12. The method according to claim 10, comprising the step of adjusting the desired heat flux range to a different desired heat flux range in response to a user input.

13. The method according to claim 12, wherein the adjusting step includes adjusting an oscillation interval within the desired heat flux range.

14. The method according to claim 1, comprising the step of controlling the thermal conditioning device to maintain a desired seat surface temperature.

15. The method according to claim 14, wherein the desired seat surface temperature is in a range of 32.0° C. to 35.5° C.

16. The method according to claim 1, comprising the step of controlling the seat thermal conditioning device to maintain a user skin temperature in a range of 30° C. to 36° C.

17. The method according to claim 16, wherein the user skin temperature maintaining step is performed according to the equation $$T_S = \frac{q}{k/t + F_{cl}} + T_B$$

where $T_S$ is skin temperature, $T_B$ is measured temperature at a back of seat upholstery, q is heat flux between occupant and seat back, t is seat upholstery thickness, k is seat upholstery thermal conductivity, and Fa is clothing thermal conductivity for typical season attire.

18. The method according to claim 8, wherein the heat flux inversion corresponds to a thermal equilibrium point between the occupant and the component.

19. The method according to claim 1, wherein at least one heat flux sensor is arranged only in the seat back of the seat, and the thermal conditioning device in the seat bottom is controlled based upon the heat flux sensor in the seat back.

20. The method according to claim 8, wherein the component is a steering wheel.

21. An autonomous seat climate control system comprising:
a seat having a seat back and a seat bottom;
a heat flux sensor configured to detect a heat flux relating to occupant thermal comfort provided by the seat;
a seat back thermal conditioning device arranged in the seat back;
a seat bottom thermal conditioning device arranged in the seat bottom; and
a controller configured to command the seat thermal conditioning device in response to the detected heat flux, and the seat back and seat bottom thermal conditioning devices are controlled based upon the same heat flux sensor.

22. The system according to claim 21, wherein the controller is configured to command the thermal conditioning device in response to a heat flux inversion, and the controller is configured to command the thermal conditioning device to maintain a desired heat flux once the heat flux inversion has been detected.

23. The system according to claim 21, wherein the seat has an aesthetic cover, and the heat flux sensor is supported on the aesthetic cover.

24. The system according to claim 23, wherein the heat flux sensor is arranged in a join seam of the aesthetic cover.

25. The system according to claim 21, wherein the seat has an aesthetic cover, and the heat flux sensor is arranged beneath the aesthetic cover.

26. The system according to claim 25, wherein the seat includes a breathable backing, and the heat flux sensor is arranged between the breathable backing and the aesthetic cover.

27. The system according to claim 21, wherein the seat includes a cushion providing a fluid passage, the thermal conditioning device is in fluid communication with the fluid passage, and the heat flux sensor is aligned above the fluid passage.

28. The system according to claim 27, wherein at least one of the seat back and seat bottom thermal conditioning devices includes a thermoelectric device and a blower.

29. The system according to claim 21, wherein the heat flux sensor is a single heat flux sensor in the seat back.

30. The system according to claim 21, wherein the controller is configured to asymmetrically regulate the seat back and seat bottom thermal conditioning devices based upon a heat flux inversion using the heat flux, the heat flux inversion corresponds to a change in occupant thermal comfort.

* * * * *